United States Patent
Yamaguchi et al.

(10) Patent No.: US 6,182,456 B1
(45) Date of Patent: Feb. 6, 2001

(54) SUPERCRITICAL REFRIGERATING CYCLE SYSTEM

(75) Inventors: Motohiro Yamaguchi, Hoi-gun; Shin Nishida, Anjo; Toshiro Fujii; Naoya Yokomachi, both of Kariya, all of (JP)

(73) Assignees: Denso Corporation; Kabushiki Kaisha Jidoshokki Seisakusho, both of Kariya (JP)

( * ) Notice: Under 35 U.S.C. 154(b), the term of this patent shall be extended for 0 days.

(21) Appl. No.: 09/287,814

(22) Filed: Apr. 7, 1999

(30) Foreign Application Priority Data

Apr. 20, 1998 (JP) .................................................. 10-109426

(51) Int. Cl.[7] ...................................................... F25B 1/00
(52) U.S. Cl. .................................. 62/222; 62/204; 62/210
(58) Field of Search .............................. 62/203, 204, 208, 62/209, 210, 212, 222, 224, 225, 228.1, 228.3, 228.4, 228.5, 114, 502, 503

(56) References Cited

U.S. PATENT DOCUMENTS

| 5,245,836 | 9/1993 | Lorentzen et al. | 62/503 |
| 5,685,160 | 11/1997 | Abersfelder et al. | 62/114 |
| 5,694,784 | * 12/1997 | Frey et al. | 62/228.5 |
| 5,890,370 | * 9/1999 | Sakakibara et al. | 62/222 |

FOREIGN PATENT DOCUMENTS

| 0 604 417 B1 | 4/1996 | (EP) . |
| 9-264622 | 10/1997 | (JP) . |

OTHER PUBLICATIONS

International Journal Of Refrigeration—International Institute Of Refrigeration, vol. 16, No. 1, 1993.

* cited by examiner

Primary Examiner—Harry B. Tanner
(74) Attorney, Agent, or Firm—Harness, Dickey & Pierce, PLC

(57) ABSTRACT

A $CO_2$ cycle system having a variable capacity compressor is controlled even when the refrigerant delivery capacity of the variable capacity compressor changes. When the refrigerant delivery capacity of the variable capacity compressor decreases, the aperture of an electric expansion valve is fixed for a predetermined time To. When the refrigerant delivery capacity has not changed, the aperture of the electric expansion valve is controlled so that the refrigerant temperature and pressure on the outlet side of a system heat exchanger change along an optimal control line. As a result, because the refrigerant delivery capacity Qd of the compressor is controlled in correspondence with the intake pressure Ps, i.e., the pressure on the side of the evaporator, without being influenced by control of the expansion valve side, the $CO_2$ cycle system can be adequately controlled.

18 Claims, 4 Drawing Sheets

SUPERCRITICAL REFRIGERATING CYCLE SYSTEM

CROSS-REFERENCE TO RELATED APPLICATION

The present application is related to, and claims priority from, pending Japanese Patent Application No. 10109426, filed Apr. 20, 1998, the contents of which are incorporated herein by reference.

BACKGROUND OF THE INVENTION

1. Field of the Invention

This invention relates to a refrigerating cycle system wherein the pressure of a refrigerant on a high-pressure heat exchanger side exceeds the critical pressure of the refrigerant, and particularly to such a refrigerating cycle system having carbon dioxide ($CO_2$) as its refrigerant (hereinafter a $CO_2$ cycle system).

2. Description of the Related Art

In a $CO_2$ cycle system, such as the one disclosed in Japanese Published Application No. Hei. 3-503206, refrigerating capacity is controlled via control of pressure on the heat exchanger outlet side.

In this connection, the present applicant has already proposed in Japanese Patent Application No. Hei. 8-11248 a $CO_2$ cycle system, or supercritical refrigerating cycle system, wherein the aperture of a valve disposed on the heat exchanger outlet side is adjusted in correspondence with the refrigerant temperature thereat.

Specifically, when the refrigerant temperature on the outlet side of the heat exchanger rises, the valve aperture is reduced to raise the refrigerant pressure on the heat exchanger outlet side. When the refrigerant temperature on the heat exchanger outlet side falls, the valve is adjusted to reduce the refrigerant pressure thereat.

However, a so-called variable capacity compressor has certain limitations when applied to a $CO_2$ cycle system in a vehicle air-conditioning system.

With not only $CO_2$ cycle systems but also with any refrigerating cycle system using a variable capacity compressor, when the engine speed is relatively high and the mass flow of refrigerant circulating in the refrigerating cycle is large, or when the temperature inside the passenger compartment is stable and the refrigerating capacity required of the air-conditioning system is relatively small, the refrigerant delivery capacity of the compressor is reduced to prevent the refrigerating capacity from becoming excessive.

When a variable capacity compressor and valve having its aperture controlled in correspondence with the refrigerant temperature on the heat exchanger outlet side as in the application mentioned above (Japanese Patent Application No. Hei. 8-11248) are combined, such as when the refrigerant delivery capacity on the compressor side is reduced to prevent the refrigerating capacity from becoming excessively large, the refrigerant pressure on the corresponding heat exchanger outlet side falls.

However, on the valve side, to maintain the refrigerant pressure on the outlet side of the heat exchanger at a pressure (refrigerating capacity) corresponding to the refrigerant temperature on the outlet side of the heat exchanger at that time, the aperture of the valve is reduced to raise the refrigerant pressure on the outlet side of the heat exchanger.

In other words, whereas the refrigerant delivery capacity of the compressor is controlled on the compressor side in correspondence with the required refrigerating capacity, control on the valve side attempts to maintain the refrigerating capacity corresponding to the refrigerant temperature on the heat exchanger outlet side. Thus when these two forms of control are combined, the $CO_2$ cycle cannot be adequately controlled.

SUMMARY OF THE INVENTION

It is therefore an object of the present invention to provide a supercritical refrigerating cycle system having a variable capacity compressor, the system being adequately controlled even when the refrigerant delivery capacity of the variable capacity compressor changes.

To achieve the above-mentioned object and other objects, a preferred embodiment of the present invention includes a supercritical refrigerating cycle system having a variable capacity compressor. When it is determined that the refrigerant delivery capacity of the compressor has not changed, the aperture of a valve disposed on an outlet side of a heat exchanger for cooling refrigerant delivered from the compressor is controlled. The valve is controlled based on a first preset program corresponding to the temperature of refrigerant on the outlet side of the heat exchanger as detected by a refrigerant temperature detector. When it is determined that the refrigerant delivery capacity has changed, the aperture of the valve is controlled based on a second program different from the first program.

Alternatively, when it is determined that the refrigerant delivery capacity has changed, the controller may fix the valve aperture via the second program. Preferably, the aperture is fixed at a setting corresponding to the setting when the first program was initially suspended.

Another preferred embodiment of the present invention is similar to the above-discussed embodiment, except that when it is determined that the refrigerant delivery capacity has changed, the second program controls the valve aperture so that the aperture percentage change is smaller than when the aperture is controlled based on the first program.

In yet another preferred embodiment, when it is determined that the refrigerant delivery capacity has changed, the second program controls the valve aperture so that the pressure on the outlet side of the heat exchanger approaches a second target pressure lower than the first target pressure.

According to another preferred embodiment, when it is determined that the refrigerant delivery capacity has changed, the second program controls the valve aperture based on the aperture setting when the first program was suspended as long as the value detected by the intake pressure change detector remains above a predetermined value, or by suspending the first program for a predetermined time.

In all of the above-mentioned embodiments, it is possible to suppress the degree to which the variable capacity compressor is influenced by the valve side, and thus it is possible to accurately control the supercritical refrigerating cycle.

DETAILED DESCRIPTION OF THE PREFERRED EMBODIMENTS (First Preferred Embodiment)

Figure 1:
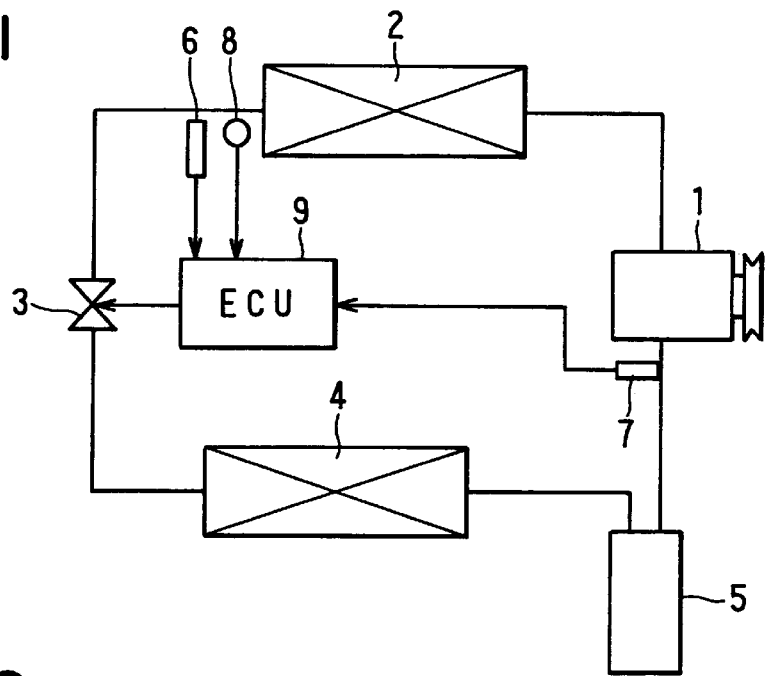
FIG. 1 is a schematic view of a $CO_2$ cycle system according to the invention.

FIG. 1 is a schematic view of a supercritical refrigerating cycle system according to a first preferred embodiment of the present invention applied as a vehicle $CO_2$ cycle system. In FIG. 1, a compressor 1 receives and compresses a refrigerant ($CO_2$). The compressor 1 is a known variable capacity type compressor constructed so that its refrigerant delivery capacity Qd decreases in correspondence with any decrease in its intake pressure Ps. Here, the refrigerant delivery capacity Qd refers to the theoretical amount of refrigerant discharged from the compressor 1 each time a shaft (not shown) of the compressor 1 rotates through one revolution.

In this preferred embodiment, the compressor 1 is driven by a vehicle engine (not shown) by way of a V-belt.

A heat exchanger 2 cools refrigerant delivered from the compressor 1, and the internal pressure of this heat exchanger 2 exceeds the critical pressure of the refrigerant.

An electric expansion valve 3 reduces the pressure of the refrigerant and controls the refrigerant pressure on the outlet side of the heat exchanger 2 by having its aperture controlled based on the refrigerant temperature on the outlet side of the heat exchanger 2. The electric expansion valve 4 is controlled electrically by an electronic control unit 9, which will be later discussed.

An evaporator 4 cools air by evaporating liquid phase refrigerant from two-phase gas/liquid refrigerant flowing out of the expansion valve 3. An accumulator 5 stores surplus refrigerant of the $CO_2$ cycle and separates the refrigerant flowing out from the evaporator 4 into gas phase refrigerant and liquid phase refrigerant, and allows only gas phase refrigerant to flow out to the intake side of the compressor 1.

A first pressure sensor 6 detects the refrigerant pressure on the outlet side of the heat exchanger 2, a second pressure sensor 7 detects the pressure on the intake side of the compressor 1, and a temperature sensor 8 detects the refrigerant temperature on the outlet side of the heat exchanger 2.

Output signals of the sensors 6–8 are input into the above-mentioned electronic control unit (ECU) 9, and by following a pre-stored program the ECU 9 controls the aperture of the expansion valve 3 in correspondence with the signals input from the sensors 6–8.

Figure 2:
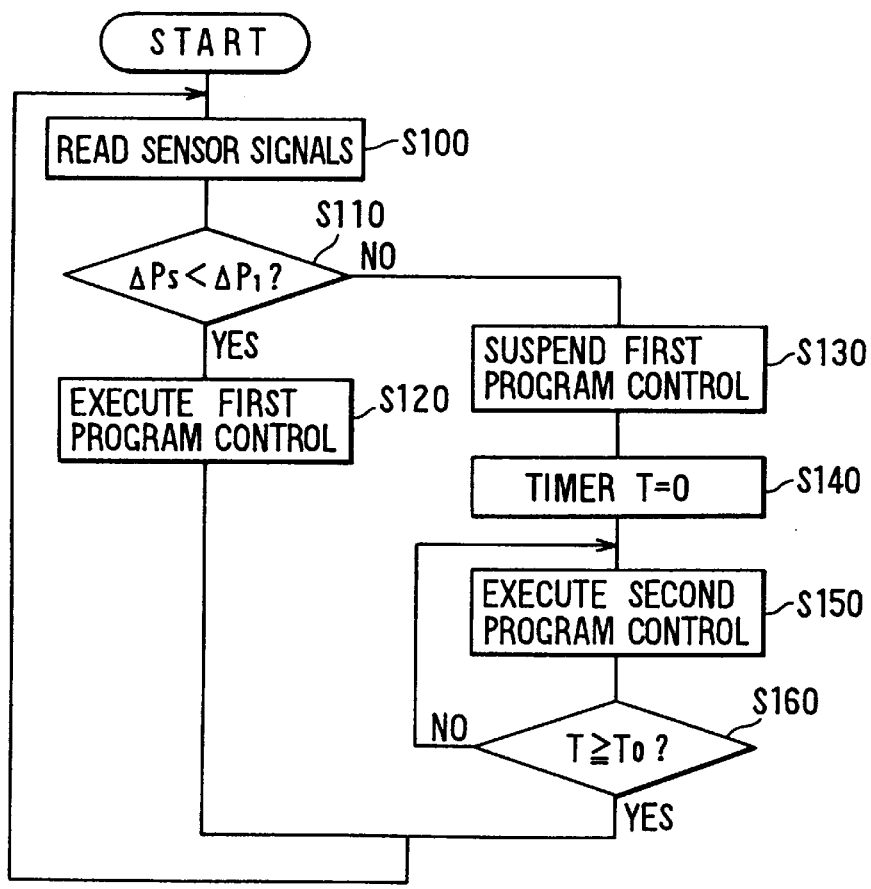
FIG. 2 is a control flow diagram of an ECU in first through third preferred embodiments of the invention.

In this preferred embodiment, the control operation of the expansion valve 3 is different before and after a change in the refrigerant delivery capacity Qd of the compressor 1, as will now be described based on the control flow diagram of the ECU 9 shown in FIG. 2.

When a starting switch (not shown) of the $CO_2$ cycle system is turned on and the $CO_2$ cycle system starts up, the ECU 9 reads in the signals from the sensors 6–8 (S100) and determines whether or not a percentage pressure change $\Delta Ps$ (in this preferred embodiment, a percentage decrease) in the intake pressure Ps (the value detected by the second pressure sensor 7) is less than a predetermined value $\Delta P1$ (S110).

Figure 3:
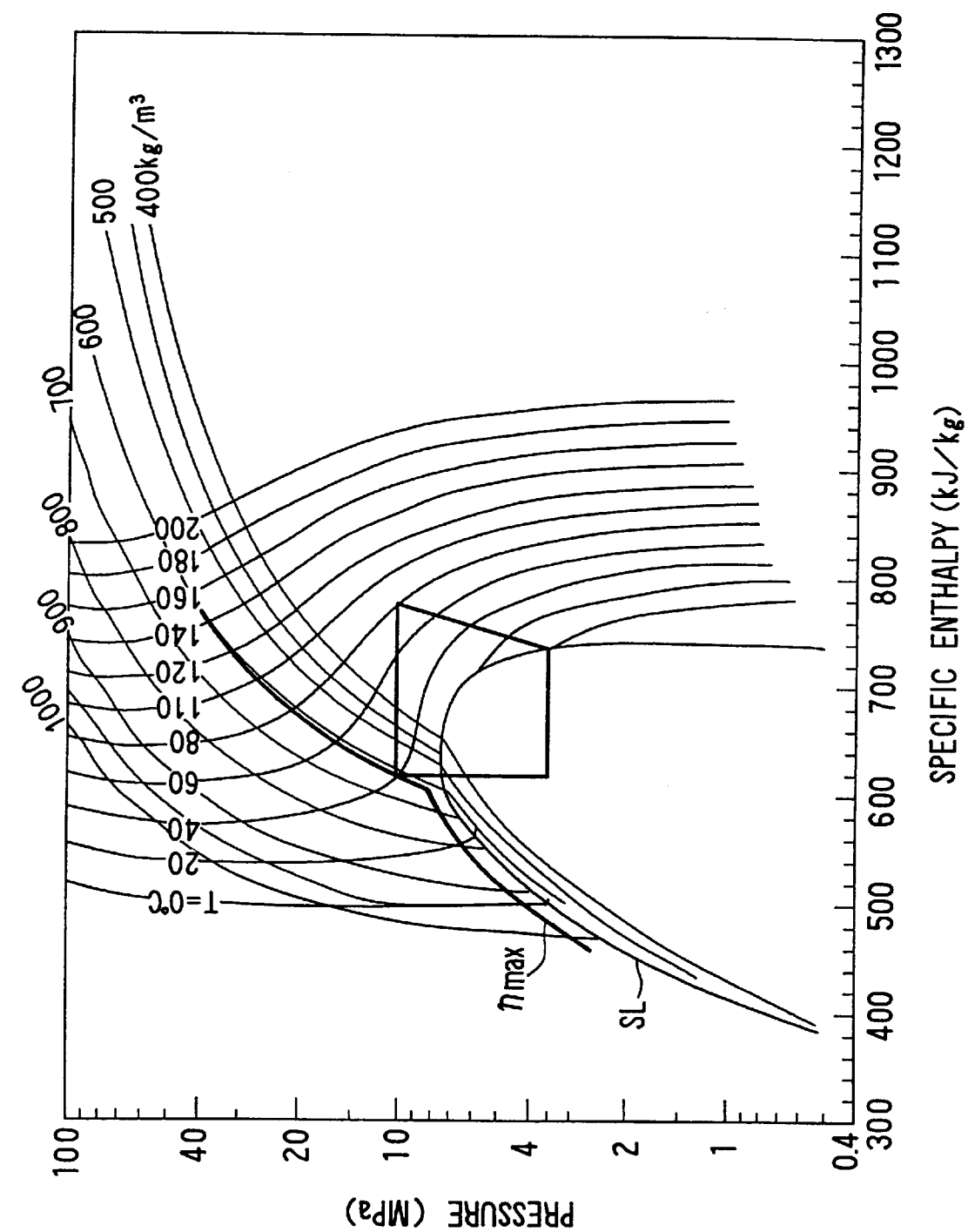
FIG. 3 is a Mollier diagram for $CO_2$.

When the percentage pressure change $\Delta Ps$ is less than the predetermined value $\Delta P1$, the ECU 9 infers that the compressor 1 is operating with a presently-maintained refrigerant delivery capacity Qd (i.e., the refrigerant delivery capacity Qd has not changed) and controls the aperture of the expansion valve 3 according to a first program set so that the refrigerant temperature and the refrigerant pressure on the outlet side of the heat exchanger 2 assume a relationship shown by an optimal control line $\eta$max (see FIG. 3) (S120), and then returns to S100. Hereinafter this control will be called first program control.

When on the other hand the percentage pressure change $\Delta Ps$ is equal to or greater than the predetermined value $\Delta P1$, the ECU 9 infers that the intake pressure Ps and the refrigerant delivery capacity Qd of the compressor 1 have fallen, and suspends first program control and commences timing with a built-in timer (not shown) (S130, S140). The ECU 9 fixes the aperture of the expansion valve 3 at its aperture as of when first program control was suspended (S150). Then, when a predetermined time To has elapsed from commencement of the timing, processing returns to S100 (S160).

Hereinafter, control executed to control the expansion valve 3 while first program control is suspended will be called second program control.

When the refrigerant delivery capacity Qd decreases, the refrigerant temperature on the outlet side of the heat exchanger 2 falls because the mass flow of refrigerant circulating around the $CO_2$ cycle decreases. Because of this, after the predetermined time To elapses, the aperture of the expansion valve 3 (the refrigerant pressure on the outlet side of the heat exchanger 2) is controlled based on a fallen refrigerant temperature on the outlet side of the heat exchanger 2 (see the dot-dash line in FIG. 4).

The optimal control line $\eta$max is a line obtained by plotting on a Mollier diagram with respect to the refrigerant temperature on the outlet side of the heat exchanger 2 the refrigerant pressure on the outlet side of the heat exchanger 2 at which the performance coefficient of the $CO_2$ cycle (supercritical refrigerating cycle) is at a maximum.

The predetermined time To is the time required for the behavior of the $CO_2$ cycle to stabilize after the refrigerant delivery capacity Qd of the compressor 1 decreases.

Some characterizing features of this preferred embodiment will now be explained.

In this preferred embodiment, when the refrigerant delivery capacity Qd of the compressor 1 is constant, because the refrigerant temperature and the refrigerant pressure on the outlet side of the heat exchanger 2 are controlled as shown by the optimal control line $\eta$max (first program control) (see the solid line in FIG. 4), the $CO_2$ cycle system can be run while its performance coefficient remains high.

Figure 4:
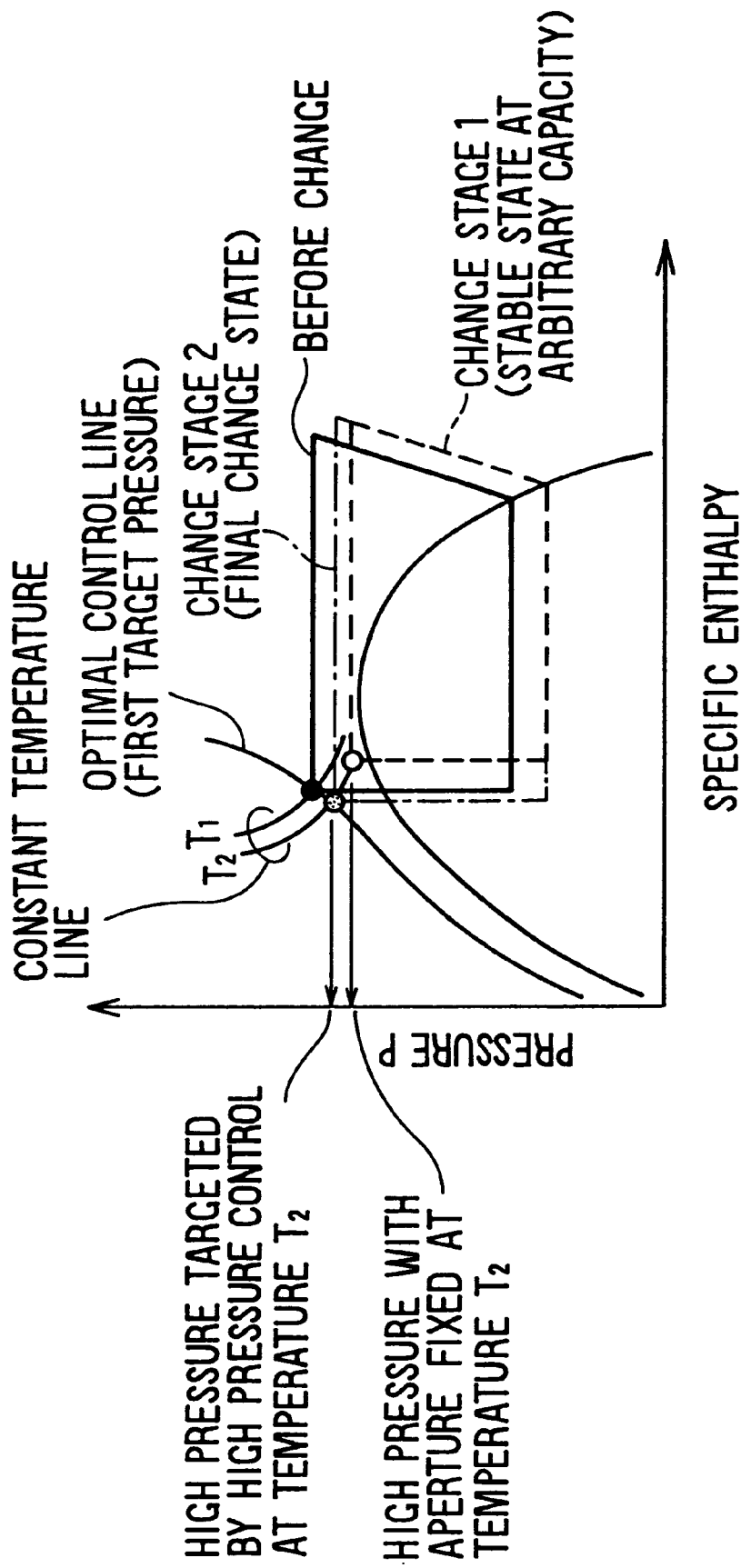
FIG. 4 is a Mollier diagram showing the operation of a $CO_2$ cycle system.

On the other hand, when the engine speed is relatively high, or when the required refrigerating capacity is relatively low, and the refrigerant delivery capacity Qd has decreased, because the aperture of the expansion valve 3 is kept at its aperture as of that time (that is, second program control is carried out), the pressure on the evaporator 4 side can be prevented from being greatly reduced through reduction of the refrigerant pressure via the expansion valve 3 (see the dashed line in FIG. 4).

Thus, because the refrigerant delivery capacity Qd of the compressor 1 is controlled in correspondence with the intake pressure Ps (the pressure on the evaporator 4 side) without being influenced by the control of the expansion valve 3 side, the $CO_2$ cycle can be suitably controlled.

(Second Preferred Embodiment)

Whereas in the preferred embodiment described above, during second program control, the aperture of the expansion valve 3 was maintained (fixed) at its aperture at the time of the shift to second program control being made, in the second preferred embodiment the aperture is finely controlled so that the percentage change in the aperture is smaller than during first program control. Otherwise the control operation of the expansion valve 3 is the same as in the first preferred embodiment.

Here, 'the aperture is finely controlled' means that the aperture is controlled over a range such that this control does not have a great effect on the control of the refrigerant delivery capacity Qd of the compressor 1.

Also, because the refrigerant delivery capacity Qd of the compressor 1 is controlled in correspondence with the intake pressure Ps without being influenced by the control of the expansion valve 3 side, the $CO_2$ cycle can be adequately controlled.

(Third Preferred Embodiment)

Figure 5:
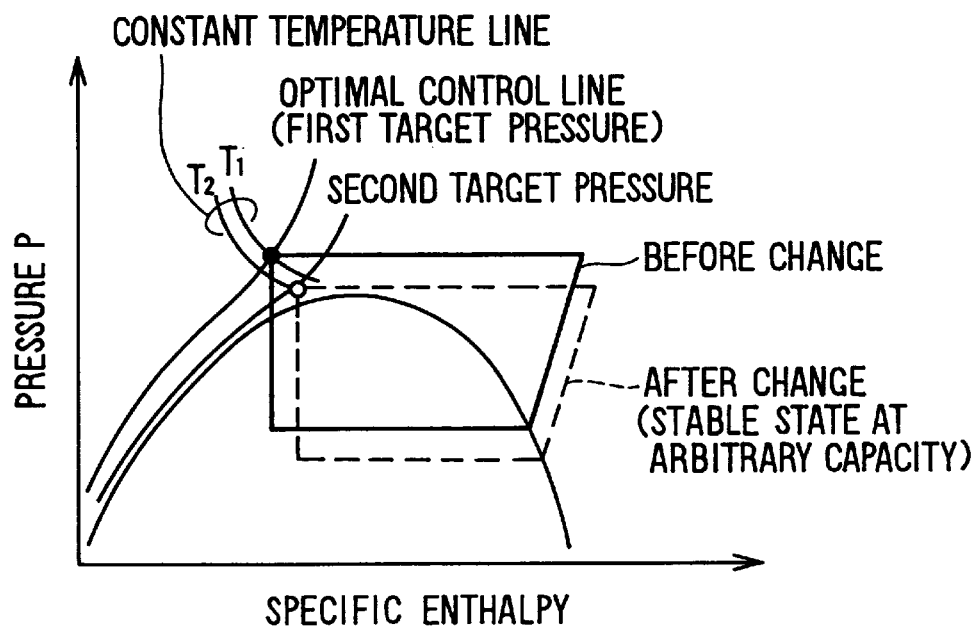
FIG. 5 is a Mollier diagram showing the operation of a $CO_2$ cycle system.

Whereas, in the second preferred embodiment, during second program control the aperture of the expansion valve 3 was controlled so that the percentage change in the aperture was smaller than during first program control, in the third preferred embodiment the aperture is controlled so that the refrigerant pressure on the outlet side of the heat exchanger 2 approaches a second target pressure lower than that determined based on the optimal control line ηmax (hereinafter, the first target pressure) (see FIG. 5). Otherwise the control operation of the expansion valve 3 is the same as in the first preferred embodiment.

The second target pressure is a pressure set so that, as in the second preferred embodiment, the aperture is controlled over a range such that this control does not have a great affect on the control of the refrigerant delivery capacity Qd of the compressor 1.

(Fourth Preferred Embodiment)

Whereas in the preferred embodiments described above second program control was executed for a predetermined time To from when the refrigerant delivery capacity Qd decreased, in this fourth preferred embodiment second program control is carried out from when the refrigerant delivery capacity Qd of the compressor 1 changes until the behavior of the $CO_2$ cycle stabilizes. After the behavior of the $CO_2$ cycle has stabilized, the first program control is resumed.

Figure 6:
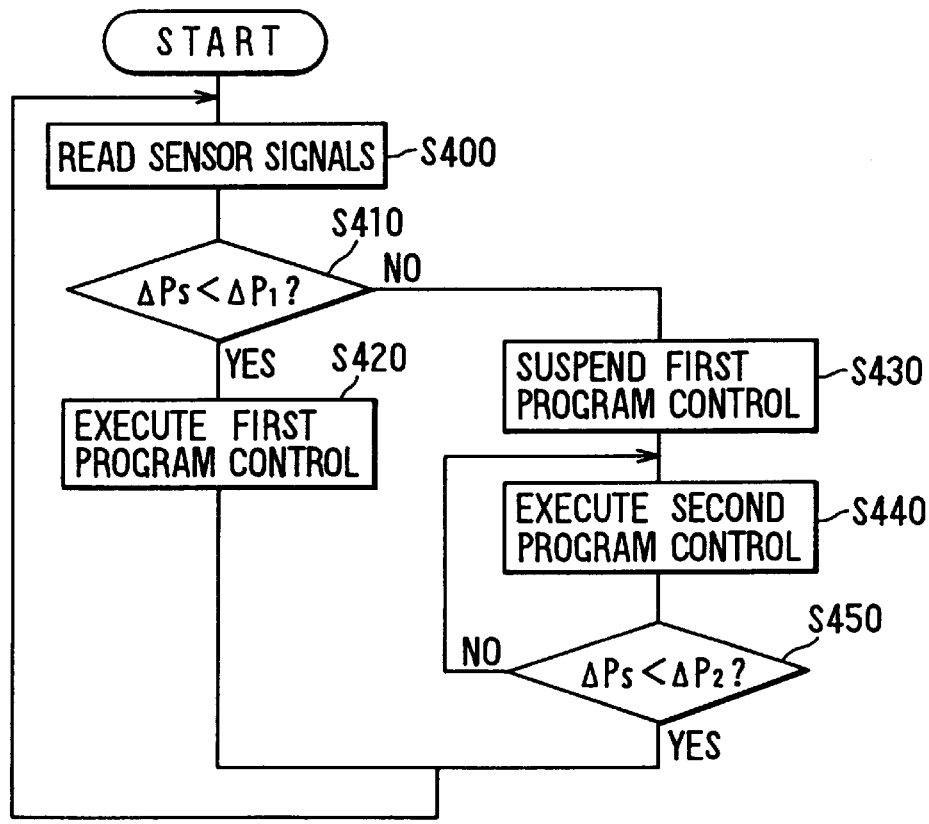
FIG. 6 is a control flow diagram of an ECU in a fourth preferred embodiment of the invention.

This characterizing operation of the present preferred embodiment will now be explained based on the control flow diagram of the ECU 9 shown in FIG. 6.

When the starting switch of the $CO_2$ cycle system is turned on and the $CO_2$ cycle system starts up, the ECU 9 reads in the signals from the sensors 6–8 (S400) and determines whether or not a percentage pressure change ΔPs in the intake pressure Ps is less than a first predetermined value ΔP1 (S410).

Then, when the percentage pressure change ΔPs is less than the first predetermined value ΔPI, the ECU 9 infers that the compressor 1 is operating with a present refrigerant delivery capacity Qd maintained (that the refrigerant delivery capacity Qd has not changed), executes first program control (S420), and then returns to S400.

When on the other hand the percentage pressure change ΔPs is equal to or greater than the first predetermined value ΔP1, the ECU 9 infers that the intake pressure Ps and the refrigerant delivery capacity Qd of the compressor 1 has fallen, suspends first program control (S430), and, for as long as the percentage pressure change ΔPs is greater than a second predetermined value ΔP2, infers that the behavior of the $CO_2$ cycle has not stabilized and executes second program control (S440, S450). Second program control in this preferred embodiment, as in the first preferred embodiment, consists of fixing the aperture of the expansion valve 3 at its aperture as of when the first program control was suspended.

When the percentage pressure change ΔPs has fallen to below the second predetermined value ΔP2, it is inferred that the behavior of the $CO_2$ cycle has stabilized, and processing returns to S400.

Although in this fourth preferred embodiment the second program control was made the same as in the first preferred embodiment, the fourth preferred embodiment is not thereby limited, and second program control therein may be made the same as in the second or the third preferred embodiment.

And although in the preferred embodiments described above the invention was described using the example of a $Co_2$ cycle, the invention is not limited to this and can also be applied to a supercritical refrigerating cycle having for example ethylene, ethane, or nitrogen oxide as a refrigerant.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A supercritical refrigerating cycle system, comprising:
   a variable capacity compressor having a refrigerant delivery capacity corresponding to a compressor intake pressure;
   a heat exchanger for cooling a refrigerant delivered by the variable capacity compressor, the heat exchanger having an internal pressure exceeding a critical pressure of the refrigerant;
   a valve disposed on the outlet side of the heat exchanger and having a controllable aperture;
   an evaporator for evaporating refrigerant flowing out from the valve;
   a refrigerant temperature detector for detecting a temperature of the refrigerant on the outlet side of the heat exchanger;
   determining means for determining whether or not the refrigerant delivery capacity of the variable capacity compressor has changed; and
   control means for electrically controlling the aperture of the valve,
   wherein when it is determined by the determining means that the refrigerant delivery capacity has not changed, the control means controls the aperture of the valve based on a preset first program in correspondence with the temperature detected by the refrigerant temperature detector, and when it is determined by the determining means that the refrigerant delivery capacity has changed, the control means controls the aperture of the valve based on a second program that suppresses influence of the valve on the compressor.

2. The supercritical refrigerating cycle system of claim 1, wherein the first program controls the aperture of the valve based on a temperature detected by the refrigerant temperature detector, and the second program fixes the aperture of the valve.

3. The supercritical refrigerating cycle system of claim 2, wherein the second program fixes the aperture of the valve at an aperture setting corresponding to the aperture when the first program is suspended.

4. The supercritical refrigerating cycle system of claim 1, wherein the second program controls the aperture of the expansion valve based on a fallen refrigerant temperature on the outlet side of the heat exchanger.

5. The supercritical refrigerating cycle system of claim 1, wherein the first program controls the aperture of the valve in correspondence with the temperature detected by the refrigerant temperature detector, and the second program controls the aperture of the valve so that a percentage change in the aperture is smaller than when the aperture is controlled based on the first program.

6. The supercritical refrigerating cycle system of claim 1, wherein the first program controls the aperture of the valve so that the pressure on the outlet side of the heat exchanger approaches a first target pressure determined based on the temperature detected by the refrigerant temperature detector, and the second program controls the aperture of the valve so that the pressure on the outlet side of the heat exchanger approaches a second target pressure lower than the first target pressure.

7. The supercritical refrigerating cycle system of claim 1, wherein the first program controls the aperture of the valve based on a preset program in correspondence with the temperature detected by the refrigerant temperature detector, and the second program suspends control of the aperture of the valve based on the first program while a pressure value detected by the intake pressure change detector is above a predetermined value.

8. The supercritical refrigerating cycle system of claim 1, wherein the first program controls the aperture of the valve in correspondence with the temperature detected by the refrigerant temperature detector, and the second program suspends program control of the aperture for a predetermined time.

9. The supercritical refrigerating cycle system of claim 1, wherein the refrigerant is selected from a group consisting of: $CO_2$, ethylene, ethane, and nitrogen oxide.

10. A supercritical refrigerating cycle system, comprising:
a variable capacity compressor having a refrigerant delivery capacity that corresponds to a compressor intake pressure;
a heat exchanger for cooling a refrigerant delivered by the variable capacity compressor, and having an internal pressure exceeding the critical pressure of the refrigerant;
a valve disposed on the outlet side of the heat exchanger and having a controllable aperture;
a controller for determining whether or not the refrigerant delivery capacity of the variable capacity compressor has changed, and for controlling the aperture of the valve;
wherein when the controller determines that the refrigerant delivery capacity has not changed, the controller controls the aperture of the valve based on a detected refrigerant temperature, and when the controller determines that the refrigerant delivery capacity has changed, the controller controls the aperture of the valve to suppress influence of the valve on the compressor.

11. The supercritical refrigerating cycle system of claim 10, wherein the controller fixes the aperture of the valve when a change in the refrigerant delivery capacity is detected.

12. The supercritical refrigerating cycle system of claim 11, wherein when a change in the refrigerant delivery capacity is detected, the controller fixes the aperture of the valve at an aperture setting corresponding to the aperture setting when control based on no change in the refrigerant delivery capacity is suspended.

13. The supercritical refrigerating cycle system of claim 10, wherein when a change in the refrigerant delivery capacity is detected the controller controls the aperture of the expansion valve based on a fallen refrigerant temperature on the outlet side of the heat exchanger.

14. The supercritical refrigerating cycle system of claim 10, wherein the controller controls the aperture of the valve when a change in the refrigerant delivery capacity is detected so that a percentage change of the aperture is smaller than when the aperture is controlled based on no change in the refrigerant delivery capacity.

15. The supercritical refrigerating cycle system of claim 10, wherein the controller controls the aperture of the valve so that, when a change in the refrigerant delivery capacity is not detected, the pressure on the outlet side of the heat exchanger approaches a first target pressure determined based on the detected refrigerant temperature; and
the controller controls the aperture of the valve when a change in the refrigerant delivery capacity is detected so that the pressure on the outlet side of the heat exchanger approaches a second target pressure lower than the first target pressure.

16. The supercritical refrigerating cycle system of claim 10, wherein the controller suspends control of the approaches of the valve when the detected intake pressure change is above a predetermined value.

17. The supercritical refrigerating cycle system of claim 10, wherein the controller suspends control of the aperture for a predetermined time when a change in the refrigerant delivery capacity is detected.

18. The supercritical refrigerating cycle system of claim 10, wherein the refrigerant is selected from a group consisting of: $CO_2$, ethylene, ethane, and nitrogen oxide.

* * * * *

UNITED STATES PATENT AND TRADEMARK OFFICE
CERTIFICATE OF CORRECTION

PATENT NO.   : 6,182,456 B1
DATED        : February 6, 2001
INVENTOR(S)  : Motohiro Yamaguchi et al.

It is certified that error appears in the above-identified patent and that said Letters Patent is hereby corrected as shown below:

Title page, Item [73],
Assignee, after "Kaisha" insert -- Toyoda --

Signed and Sealed this

Sixth Day of November, 2001

Attest:

NICHOLAS P. GODICI
Attesting Officer    Acting Director of the United States Patent and Trademark Office